(12) United States Patent
Straeussnigg

(10) Patent No.: US 6,856,684 B1
(45) Date of Patent: Feb. 15, 2005

(54) DEVICE AND METHOD FOR ECHO COMPENSATION IN A TWO-WIRE FULL DUPLEX CHANNEL TRANSMISSION METHOD

(75) Inventor: Dieter Straeussnigg, Villach (AT)

(73) Assignee: Infineon Technologies AG, München (DE)

( * ) Notice: Subject to any disclaimer, the term of this patent is extended or adjusted under 35 U.S.C. 154(b) by 253 days.

(21) Appl. No.: 10/129,804

(22) PCT Filed: Nov. 17, 2000

(86) PCT No.: PCT/EP00/11478

§ 371 (c)(1),
(2), (4) Date: Jul. 30, 2002

(87) PCT Pub. No.: WO01/37444

PCT Pub. Date: May 25, 2001

(30) Foreign Application Priority Data

Nov. 18, 1999 (DE) .......................... 199 55 596

(51) Int. Cl.[7] .............................................. H04M 1/00
(52) U.S. Cl. .............................. 379/406.05; 379/406.08
(58) Field of Search ...................... 379/406.01, 406.05, 379/406.08; 370/286, 289, 290, 291; 375/222; 708/319; 455/266, 340

(56) References Cited

U.S. PATENT DOCUMENTS

| | | | | |
|---|---|---|---|---|
| 5,084,865 A | * | 1/1992 | Koike | 379/406.08 |
| 5,917,809 A | | 6/1999 | Ribner et al. | |
| 6,421,377 B1 | * | 7/2002 | Langberg et al. | 379/406.08 |
| 6,430,287 B1 | * | 8/2002 | Rao | 379/406.08 |

FOREIGN PATENT DOCUMENTS

| | | |
|---|---|---|
| DE | 3886070 T2 | 4/1994 |
| EP | 0347394 A1 | 12/1989 |
| EP | 0384490 A2 | 8/1990 |

* cited by examiner

Primary Examiner—Forester W. Isen
Assistant Examiner—Jefferey Harold
(74) Attorney, Agent, or Firm—Jenkins, Wilson & Taylor, P.A.

(57) ABSTRACT

Method and device for echo compensation with a common-frequency transmission method in duplex mode over a two-wire line, an echo compensation filter which has adjustable coefficients and is embodied as an FIR filter being arranged between the transmitter output and receiver input and an IIR filter with adjustable coefficients, whose coefficients can be determined as a function of the coefficients of the FIR filter, being additionally provided.

7 Claims, 5 Drawing Sheets

DEVICE AND METHOD FOR ECHO COMPENSATION IN A TWO-WIRE FULL DUPLEX CHANNEL TRANSMISSION METHOD

TECHNICAL FIELD

The present invention relates to a method for echo compensation with a common-frequency transmission method in duplex mode over a two-wire line.

BACKGROUND ART

In duplex transmission of data over a two-wire line, i.e. when there is simultaneous transmission in both directions (upstream and downstream), both the useful signal originating from the opposite station and echoes resulting from the receiver's own transmitter occur at the respective receiver inputs.

Whereas the disruptive echoes can be suppressed by selective filters in the case of frequency division multiplex transmission methods, special devices for echo compensation are necessary in the case of common-frequency transmission methods.

Figure 1:
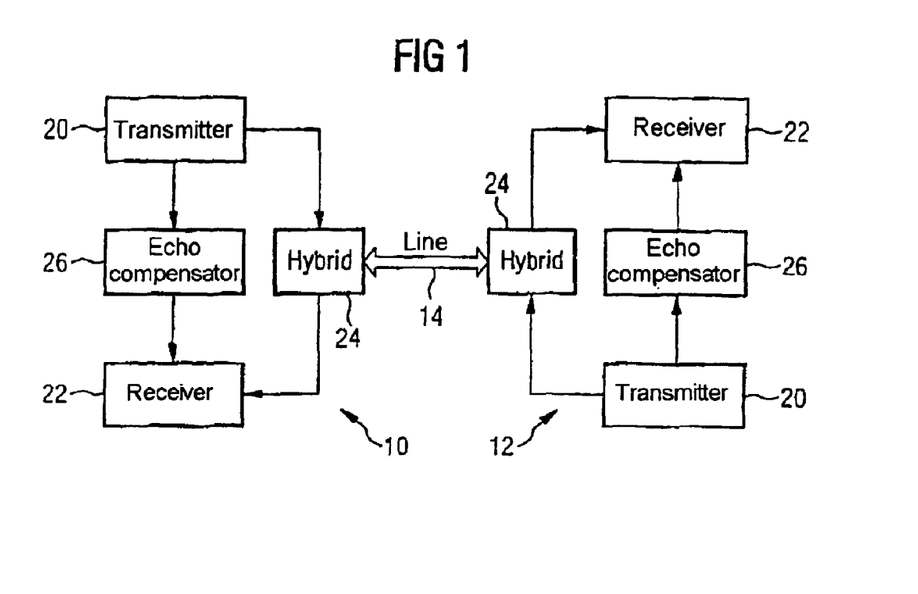
FIG. 1 shows the basic design of a duplex transmission system with echo compensator according to the prior art.

According to the prior art, transmission systems with echo compensation have been embodied with a basic arrangement as illustrated here in FIG. 1. As the echoes which occur depend to a very great extent on the analog wiring and the parameters of the line used, it is generally necessary to perform adaptive adjustment of the echo compensator.

According to the prior art, this echo compensation is performed by simulating the echo pulse response by means of an FIR filter. Filters with a finite pulse response, that is to say nonrecursive filters, are referred to as FIR filters. The convolution of the transmission signal with the echo pulse response then yields the echo to be compensated. The FIR filter can be embodied such that it is either fixed or adaptively adjustable. Preferably the gradient algorithm is used for the adaptation owing to its ease of implementation. This algorithm is described, for example, in the teaching manual "Digital filters-Analysis, Design and Applications" by Andreas Antoniou (ISBN 0-07-002121-X) on pages 625 to 634. The length of the echo pulse response determines here the necessary number of coefficients of the FIR filter.

According to the prior art, when there are correspondingly long echo pulse responses, a very large number of coefficients of the FIR filter are produced. As a result, the adaptation of the filter is very slow and the filter consequently has very poor convergence characteristics.

SUMMARY OF THE INVENTION

The object of the present invention is therefore to disclose a device and a method for echo compensation with a common-frequency transmission method in duplex mode over a two-wire line in which such "long", that is to say coefficient-rich, FIR filters are not used and significantly better convergence characteristics are obtained.

This object is achieved according to the invention in that an IIR filter, that is to say a filter with unlimited pulse response (infinite pulse response), that is to say a recursive filter, with adjustable coefficients is provided in addition to the echo compensation filter which has adjustable coefficients, is embodied as an FIR filter and is arranged between the transmitter output and receiver input.

It is particularly preferred here to provide a device for adjusting the coefficients of the IIR filter as a function of the coefficients of the FIR filter. In this way it is possible to avoid convergence problems which occur during the adaptation of a recursive (IIR) filter by means of a gradient algorithm.

It is particularly preferred here for the coefficients of the FIR filter to be adjustable as a function of the reception signal and the output signal of the FIR filter. This results in optimum convergence.

It is also particularly preferred here for the transmitter output to be connected to the FIR filter whose output is connected to the negative input of a summation point whose positive input is connected to the reception signal, a further output of the FIR filter being connected to the input of the IIR filter whose output is connected to the negative input of a further summation point whose positive input is connected to the output of the first summation point and whose output is connected to the receiver.

In addition, it is particularly preferred to provide an additional FIR filter. This makes it possible to simulate the echo pulse response particularly favorably by means of the series connection of two shortened FIR filters and one low-order IIR filter.

It is particularly preferred here for the additional FIR filter to be arranged between the output of the first FIR filter and the negative input of the first summation point.

During the transmission of data with very different data rates in the transmission and reception directions it is particularly preferred, when there is a high data rate in the transmission direction and a low data rate in the reception direction, to arrange decimation devices respectively between the two FIR filters and downstream of the output of the IIR filter.

During the transmission of data with very different data rates in the transmission and reception directions it is particularly preferred, when there is a low data rate in the transmission direction and a high data rate in the reception direction, to arrange an interpolation device between the transmitter and the first FIR filter, a decimation device between the first FIR filter and the second FIR filter, and an interpolation device at the output of the second FIR filter.

The object of the invention can be achieved to an equal extent by a method for echo compensation with a common-frequency transmission method in duplex mode over a two-wire line in which the transmitter output signal is subtracted from the receiver input signal after FIR filtering with adjustable coefficients, the FIR-filtered transmission signal being additionally subjected to IIR filtering with adjustable coefficients, and the result of this filtering also being subtracted from the receiver input signal.

It is particularly preferred here to adjust the coefficients of the IIR filtering as a function of the coefficients of the FIR filtering.

The coefficients for the FIR filtering are preferably determined here as a function of the reception signal and the output signal of the FIR filtering.

The output signal of the transmitter is preferably subtracted here from the input signal after the FIR filtering, and the FIR-filtered transmitter output signal is subjected to the IIR filtering, and this IIR-filtered signal is also subtracted from the input signal.

Particularly favorable convergence properties can be achieved here by means of double FIR filtering of the output signal of the transmitter.

During the transmission of data with very different data rates in the transmission and reception directions, it is recommended, when there is a high data rate in the transmission direction and a low data rate in the reception direction, to carry out corresponding decimation of the signal downstream of the FIR filtering and downstream of the IIR filtering, respectively.

During the transmission of data with very different data rates in the transmission and reception directions, it is recommended, when there is a low data rate in the transmission direction and a high data rate in the reception direction, to carry out interpolation (zero stuffing) of the signal to be filtered upstream of the filtering of the transmission signal.

In this case it is particularly preferred that, after first FIR filtering of the interpolated signal, further FIR filtering with a reduced data rate takes place by virtue of the signal being subjected to decimation upstream of the further FIR filtering and to interpolation downstream of the further FIR filtering.

BRIEF DESCRIPTION OF THE DRAWINGS

The present invention is explained in more detail below with reference to the exemplary embodiments illustrated in the appended drawing, in which.

DETAILED DESCRIPTION OF THE INVENTION

FIG. 1 shows the basic arrangement of a transmission system with echo compensation according to the prior art. This arrangement is used to compensate the echoes occurring at the respective receiver inputs during duplex transmission of data over a two-wire line, i.e. when there is simultaneous transmission in both directions (upstream and downstream). In the case of frequency division multiplex transmission methods, the disruptive echoes can be suppressed by means of selective filters. In the case of common-frequency transmission methods, as in the present case, this is not possible and special devices for echo compensation are necessary.

FIG. 1 therefore shows the connection between two subscribers of a duplex data transmission system which implements a common-frequency transmission method over a two-wire line.

The subscribers 10, 12 are connected via a two-wire line 14. One of the subscribers 10, 12 can, of course, also be replaced by a switching office, a data network node or the like. Each of the subscribers 10, 12 comprises a transmitter 20 and a receiver 22. As is customary with telephone technology, a hybrid circuit 24 is necessary in each case for the transmission of the signals in both directions over a single two-wire line 14. An echo compensator 26 is arranged in each between the transmitter 20 and receiver 22 in order to suppress the local echoes which occur.

Figure 2:
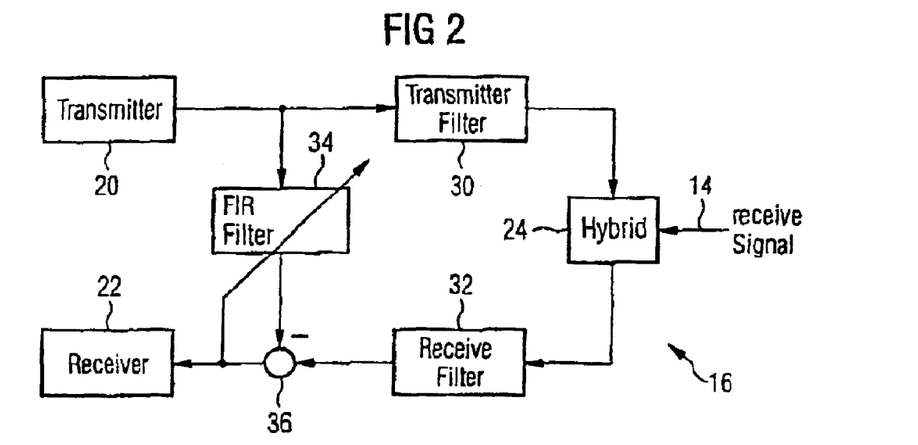
FIG. 2 shows the design of a terminal of a duplex transmission system with echo compensation by means of FIR filters with adjustable coefficients according to the prior art.

As the echoes which occur depend very greatly on the analog wiring and the parameters of the line used, it is generally necessary to perform adaptive adjustment of the echo compensator. This is explained in more detail in FIG. 2. FIG. 2 merely shows a subscriber with echo compensation by means of FIR filters (filters with a finite pulse response), that is to say a nonrecursive filter with adaptively adjustable coefficients. FIG. 2 represents at the same time the prior art on which the present invention is based.

The subscriber 16 according to FIG. 2 also comprises a transmitter 20, a receiver 22 and a hybrid circuit 24 at which the two-wire line 14 to the network exits. In addition, a transmit filter 30 and a receive filter 32 are arranged here between the transmitter 20 and hybrid 24 and between the receiver 22 and hybrid 24, respectively. An FIR filter 34 whose coefficients can be adjusted as a function of the signal occurring at the receiver 22 is used here as the echo compensator. This FIR filter 34 is connected by its input to the output of the transmitter 20 and by its output to the negative input of a summation point 36 whose other input is connected to the output of the receive filter 32, and whose output is connected to the input of the receiver 22.

In this way, the signal, filtered by the FIR filter 34 with adaptive coefficients, of the transmitter 20 is subtracted from the reception signal directed via the receive filter 32. In this way, the local echo which arises can theoretically be completely suppressed if the echo pulse response can be perfectly simulated by the FIR filter 34.

The echo compensation is therefore performed by the simulation of the echo pulse response by means of the FIR filter 34. The convolution of the transmission signal of the transmitter 20 with the echo pulse response simulated by means of the FIR filter 34 yields the echo to be compensated. According to the prior art, the FIR filter 34 can be embodied so that it is either fixed or adaptively adjustable. For the adaptation, the gradient algorithm such as is presented, for example, in the teaching manual "Digital Filters-Analysis, Design and Applications" by Andreas Antoniou (ISBN 0-07-002121-X) on pages 625 to 634 is preferably used owing to the easier implementation. The length of the echo pulse response yields the number of necessary coefficients of the FIR filter. This frequently results in very long (coefficient-rich) FIR filters. The convergence of the adaptation of the coefficients is then very slow with these filters. The convergence characteristics are unfavorable.

Figure 3:
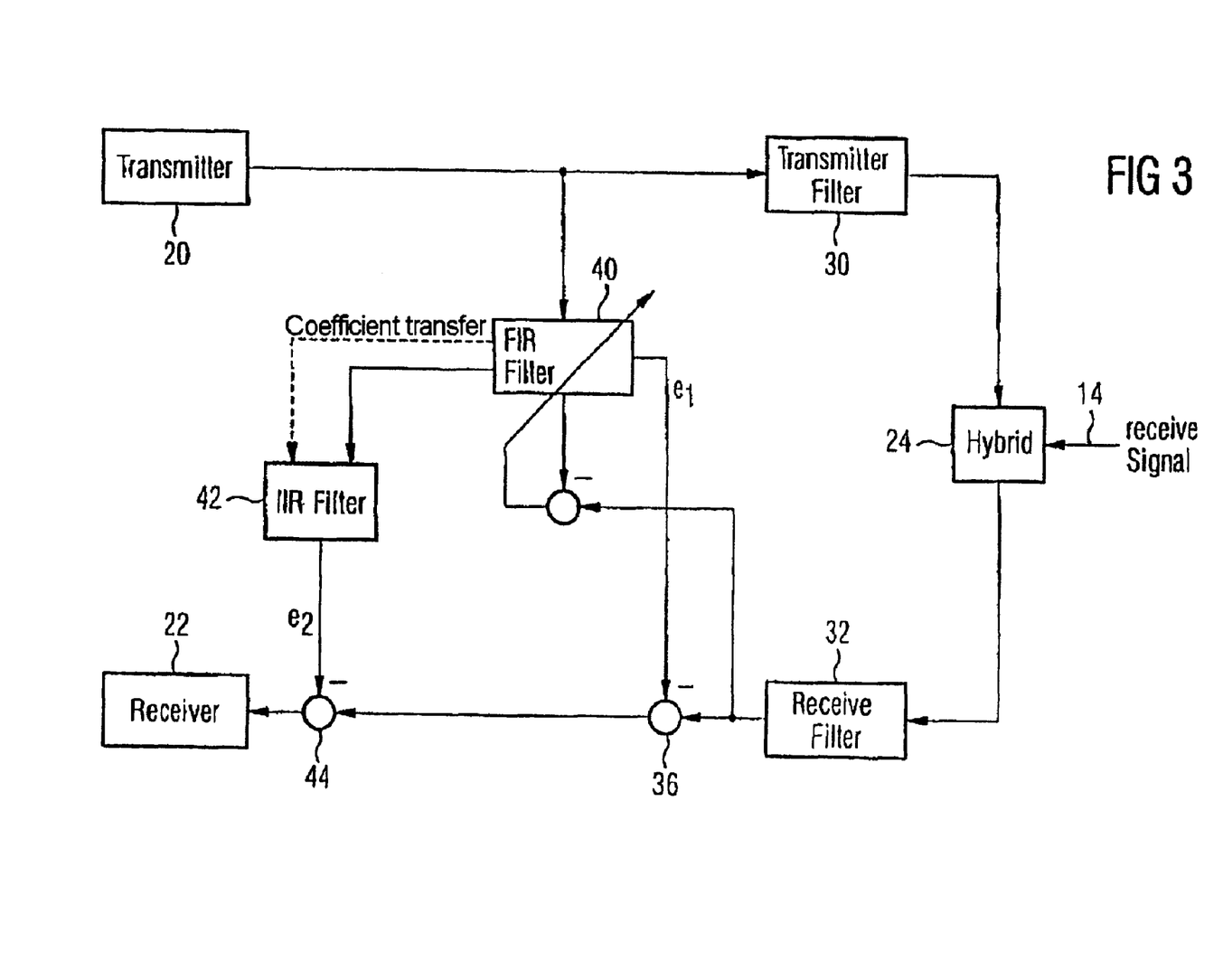
FIG. 3 shows a terminal with the inventive filtering for echo compensation.

According to the invention, the solution presented in FIG. 3 is therefore proposed in which a relatively short FIR filter 40 with adjustable coefficients is used. The adjustment of the coefficients is carried out, as is known in the prior art, either analytically or iteratively, for example with the gradient algorithm.

An IIR filter 42 is then connected downstream of the FIR filter 40. This is a recursive filter, i.e. a filter with unlimited pulse response (infinite pulse response).

In the prior art, the use of such a recursive IIR filter has previously been avoided because considerable convergence problems occur with the adaptation of such a filter, for example by means of the gradient algorithm.

According to the invention, the coefficients of the IIR filter 42 are therefore determined from the coefficients of the FIR filter 40.

In particular, the circuit according to FIG. 3 is of similar design to the prior art according to FIG. 2. Here too, a transmitter 20 and a receiver 22 are provided. The signal from the transmitter 20 is fed via the transmit filter 30 to the hybrid circuit 24 at which the two-wire line 14 of the network starts. Signals which are received over the two-wire line 14 are fed to a receive filter 32 from which they are fed to the receiver 22 after subtraction of the echo compensation signals.

However, instead of the conventional FIR filter 34 with adjustable coefficients in FIG. 2, another type of echo compensation circuit is provided here. The signal from the transmitter 20 is first also fed to an FIR filter 40 with adjustable coefficients here. This FIR filter can, however, be of considerably shorter design with the same echo compensation performance. The determination of the coefficients for this FIR filter 40 is again carried out by means of the difference between the output signal of the FIR filter 40 and the reception signal supplied by the receive filter 32.

In addition, several stages above the filter output which is used for calculating coefficients, an output signal e1 is extracted from the FIR filter, which output signal e1 is conducted to a negative input of the summation point 36 whose positive input is connected to the output of the receive filter 32. The output signal of the summation point 36 is fed here to a further summation point 44 before it reaches the receiver 22 from there. In addition, a further output signal is removed from the FIR filter 40, which output signal is fed to the input of a low-order recursive (IIR) filter 42. The coefficients of this IIR filter 42 determined from the coefficients of the FIR filter 40. The method of determination is explained below with reference to FIG. 4. The output signal e2 of the IIR filter 42 is fed to the negative input of the summation point 44.

In this way, the echo pulse response is simulated by the interconnection of a shortened FIR filter 40 and of a low-order recursive IIR filter 42.

In this way, the necessary echo pulse response can be simulated by an overall shorter filter with better convergence characteristics.

Figure 4:
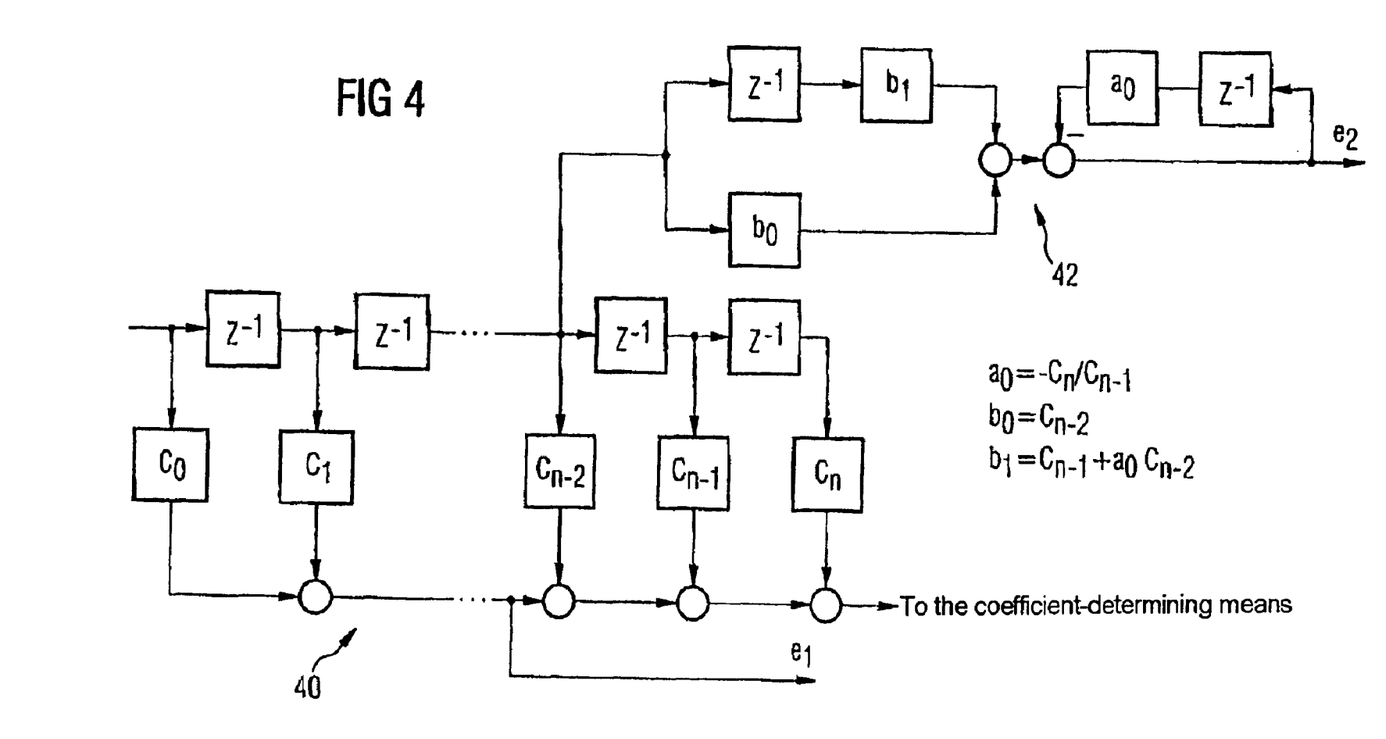
FIG. 4 shows an exemplary embodiment of the filter arrangement according to the invention.

The design of the filters 40 and 42 will be presented in detail by means of FIG. 4. Filter 40 is a conventional nonrecursive FIR filter of the order n, whose coefficients $C_0$ [sic] to $C_n$ are determined analytically or iteratively with one of the customary algorithms by means of the output signal filter and the signal originating from the receive filter 32.

For echo compensation, two stages before the end of this filter, that is to say before the summation point at which the value weighted with the coefficient $C_{n-2}$ is summed, the signal of the filter is extracted as an output signal e1. At the same time, the signal, which is also fed to the means for multiplying it with the coefficient $c_{n-2}$, is extracted. It is fed to the IIR filter 42. The coefficients $a_0$, $b_0$ and $b_1$ of this IIR filter 42 are calculated from the coefficients of the last stages of the FIR filter 40, namely from the coefficients $C_n-2$, $C_n-1$ and $C_n$. The corresponding calculation rule is also given in FIG. 4. The last stages of the FIR filter 40 are therefore used merely to determine corresponding coefficients $C_n-2$, $C_{n-1}$ and $C_n$, which are then used to calculate the coefficients of the IIR filter 42.

In this way, the convergence of the echo compensation can be improved and overall shorter filters can be used without convergence problems occurring as a result of the adaptation of the recursive filter by means of a gradient algorithm.

Further advantages can be achieved according to the invention if data is transmitted with very different data rates in both directions, for example using the ADSL method. When there are different data rates in both directions, it is in fact necessary to perform corresponding decimations or interpolations. Corresponding methods and devices for the decimation or interpolation can be found in the prior art, for example in the teaching manual "Multirate Digital Signal Processing" from Ronald E. Crochiere and Lawrence R. Rabiner (ISBN: 0-13-605162-6).

In the upstream receiver (at the exchange), the transmission signal is sampled with a w-times higher clock frequency than the reception signal. w can be defined here as w=8. After decimation at the output of the adaptive echo compensator, the echo is reconstructed here.

In the downstream receiver (at the subscriber), the reception signal is sampled with a w times higher clock frequency than that with which the transmission signal is transmitted. At the output of the echo compensator, the echo signal must therefore be reconstructed with w times the sampling frequency. This can be carried out with a nonrecursive filter which contains w different sets of coefficients (one set of coefficients for each sampled value per transmission symbol). This corresponds to an interpolation stage.

Figure 5:
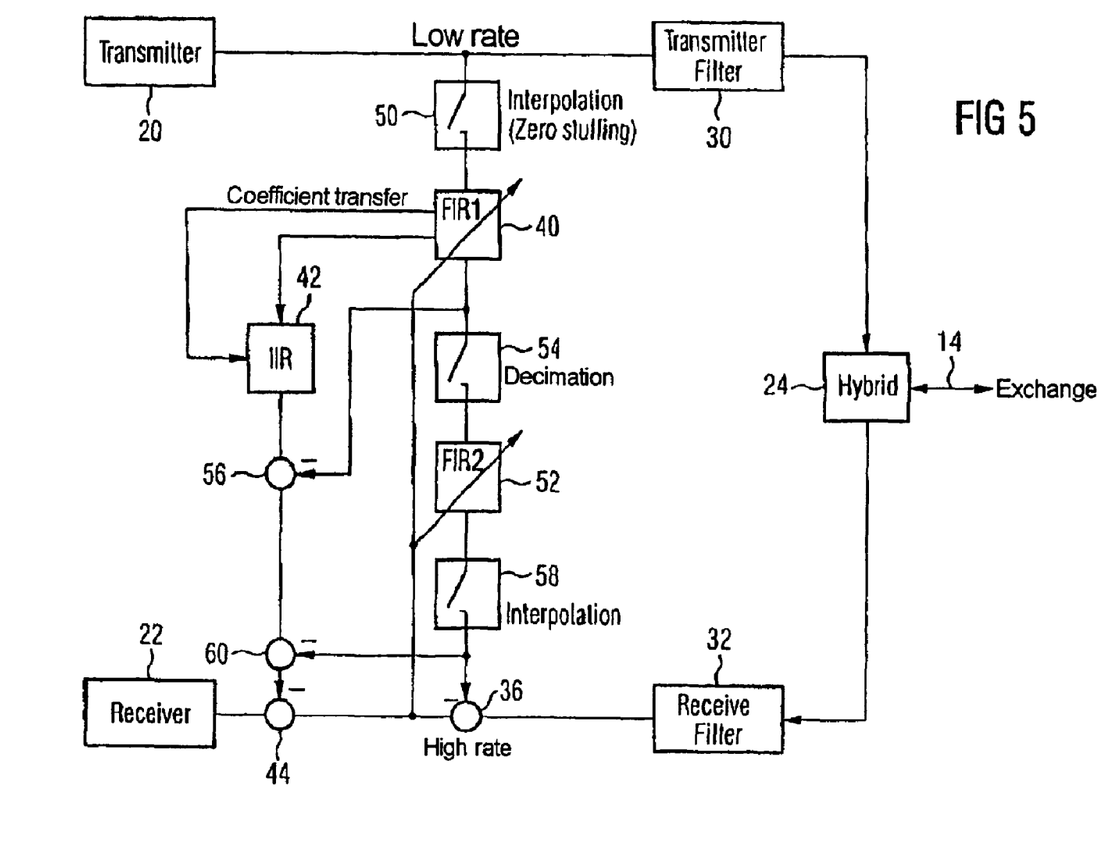
FIG. 5 shows a terminal according to the invention with echo compensation for the ADSL system at the subscriber end.
Figure 6:
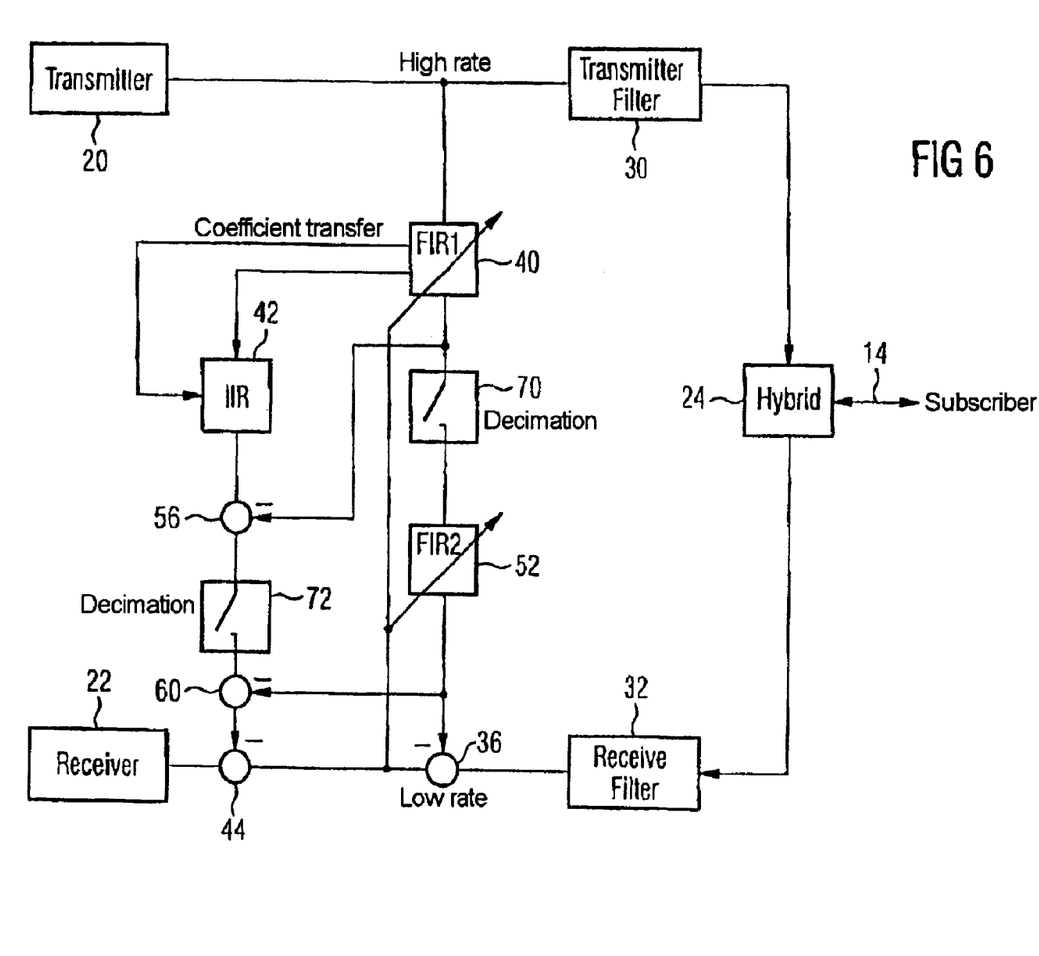
FIG. 6 shows a corresponding terminal according to the invention for the ADSL system at the exchange end.

According to the invention, this procedure can also be greatly simplified. The respective circuits are illustrated in FIGS. 5 and 6. FIG. 5 shows here the "subscriber" side, for example in the case of ADSL, in which transmission is carried out at a low rate and reception at a high rate. Here too, a transmitter 20 is again provided which is connected via a transmit filter 30 to the hybrid circuit 24 at which the two-wire line 14 is connected to the exchange. The signals which arrive from the exchange over the two-wire line 14 are conducted to the receive filter 32 via the hybrid circuit 24 and fed from there to the receiver 22 after subtraction of the respective echo values. The receive filter 32 and receiver 22 operate here with the high data rate, transmitter 20 and transmit filter 30 operate with the low data rate.

The echo pulse response is simulated here by the series connection of two shortened FIR filters and of one recursive low-order IIR filter. The first FIR filter 40 is operated with the high sampling frequency, for which the interpolation stage 50 is required. The second FIR filter 52 operates at the low sampling frequency which is produced by the decimation stage 54, resulting in very favorable conversion characteristics. The IIR filter 42 is operated with the higher sampling frequency, and the coefficients are determined as described with respect to FIGS. 3 and 4.

The compensation of the upstream echo on the subscriber side, for example of an ADSL system, in which transmission is carried out with a low rate and reception with a high rate, will be explained below in detail with reference to FIG. 5. The signal which is transmitted with a low rate by the transmitter 20 is fed to the echo compensation means of the interpolation stage 50 which carries out corresponding zero stuffing. The correspondingly expanded signal is fed to the first FIR filter 40 whose coefficients are determined, for example, by means of the gradient algorithm. An output signal of this first FIR filter 40 is fed, as represented also in FIG. 3, to the IIR filter 42. The coefficients of the IIR filter 42 are also determined, as illustrated in FIGS. 3 and 4, by means of the coefficients of the first FIR filter 40. This is represented in FIG. 5 by the bold arrow "coefficient transfer". The output signal of the first FIR filter 40 is fed on to the negative input of a summation point 56 whose positive input is connected to the output of the IIR filter 42.

In addition, the output of the FIR filter 40 is connected to a decimation device 54 which ensures that the second FIR filter 52 can operate at the lower sampling frequency of the transmitter. The signal with the reduced frequency is accordingly fed to the second FIR filter 52. Its output signal must then, of course, be converted in the course of a further interpolation, carried out by the interpolation device 58, to the high receiver-end data rate here. The output of the interpolation device 58 is accordingly connected to the negative input of a summation point 36 whose positive input is connected to the receive filter 32. The output of this summation point is used, inter alia, to determine the coefficients of the two FIR filters 40 and 52 (and thus also to determine the coefficients of the IIR filter 42 indirectly via these coefficients).

The output signal of the interpolation device 58 is additionally fed to the negative input of a summation point 60 whose positive input is connected to the output of the summation point 56. The output of this summation point 60 is connected to the negative input of a further summation point 44 whose output is connected to the receiver 22 and whose positive input is connected to the output of the summation point 36.

At the exchange end or control center end, illustrated in FIG. 6, transmission is carried out with the high data rate and reception with the low data rate. This exchange end also comprises once more a transmitter 20 which is connected via a transmit filter 30 to the hybrid circuit 24 to which the two-wire line 14 to the subscriber is connected. The signals coming from the subscriber to the two-wire line 14 are passed on from the hybrid circuit 24 to the receive filter 32 and finally to the receiver 22. A particular echo compensation device according to the invention is also provided here which is suitable for this application of the high transmission data rate and the low reception data rate. This device is also preferably provided for data transmission according to the ADSL standard.

Here too, the echo pulse response is simulated, as in FIG. 5, by the series connection of two shortened FIR filters and of one low-order recursive (IIR) filter. The first FIR filter 40 is also operated with the high sampling frequency which, of course, can be taken directly from the transmitter 20 here. The second FIR filter 52 operates at the low sampling frequency of the receiver end. In order to adapt the data rate, a decimation device 70 is connected between the output of the first FIR filter 40 and the input of the second FIR filter 52. A further input of the FIR filter 40 is connected once more, as represented in particular in FIGS. 3 and 4, to the IIR filter 42 whose coefficients are again determined as a function of the coefficients of the first FIR filter 40. This is also indicated here by the bold arrow "coefficient transfer". The output signal of the first FIR filter 40 is fed, on the one hand, to the decimation device 70, and from said device to the second FIR filter 52. In addition, it is fed to the negative input of the summation point 56 whose positive input is again connected to the output of the IIR filter 42. However, there is no need to feed the output signal of the summation device 56 to a further decimation device 72 here in order to reduce it to the low data rate of the receive end.

The output signal of the second FIR filter 52, which is, of course, already at the low, receiver-end data rate here, is in turn fed to the negative input of the summation point 36 whose positive input is connected to the output of the receive filter 32. The output signal of this summation point is in turn used to determine the coefficients of the two FIR filters 40 and 52. This is indicated here again by the signal line with the arrows over the filters 40 and 52. The output signal of the second FIR filter is additionally fed to the negative input of the summation point 60 which is also present here and whose input is connected to the negative input of the summation point 44. The positive input of the summation point 44 is connected to the output of the summation point 36 and the output of the summation point 44 is connected to the receiver 22. In order to appropriately adapt the data rate, a further decimation device 72 is also connected between the output of the summation point 56 and the input of the summation point 60. The decimation device 70 ensures that the second FIR filter 52 operates at the low sampling frequency of the receiver. This results in very favorable convergence characteristics. The IIR filter 42 is operated with the higher sampling frequency of the transmitter end. Convergence problems which arise during the adaptation of a recursive (IIR) filter by means of a gradient algorithm are avoided by means of the summation because the coefficients of the IIR filter are determined from the coefficients of the first FIR filter 40. The method of determination corresponds to the description of FIGS. 3 and 4. Furthermore, the coefficients of the IIR filter can be calculated from the coefficients of the first FIR filter 40, as described either analytically or iteratively (for example also by application of the gradient algorithm). In addition, the coefficients of the IIR filter 42 can also be optimized by using an increased number of filter coefficients in the first FIR filter 40.

In particular in the case of applications with very different transmission and reception data rates, such as, for example, the ADSL standard, it is possible, with the present invention, to achieve a quite substantial simplification of the filter structures of the echo compensation and of the echo compensation methods. This at the same time also provides very favorable convergence characteristics for the adaptation of the echo compensation filters.

What is claimed is:

1. Method for echo compensation with a common-frequency transmission method in duplex mode over a two-wire line for transmission of data with different data rates in the transmission and reception directions, the method comprising having the following stops:

(a) calculating filter coefficients of an IIR filter as a function of the filter coefficients of a first FIR echo compensation filter;

(b) adjusting the IIR filter in accordance with the calculated filter coefficients;

(c) filtering a transmitter output signal by means of said first FIR echo compensation filter;

(d) subtracting the FIR-filtered transmitter output signal from a receiver input signal;

(e) filtering the FIR-filtered output signal by means of said adjusted IIR filter;

(f) subtracting the FIR-filtered signal from said receiver in put signal;

(g) wherein, when there is a high data rate in transmission direction and a low data rate in reception direction, performing a corresponding decimation of the IIR-filtered signal by means of a first decimation device; and (h) wherein, when there is a low data rate in transmission direction and a high data rate in reception direction, performing interpolation of the transmitter output signal upstream of the first FIR echo compensation filter by means of a first interpolation device.

2. Method according to claim 1, wherein after filtering of the interpolated signal by means of the first FIR echo compensation filter a further filtering is performed by means of a second FIR echo compensation filter with a reduced data rate, and wherein the signal output by said first FIR echo compensation filter is subjected to a decimation by means of a second interpolation device upstream of the second FIR echo compensation filter and subjected to an interpolation by means of a second interpolation device downstream of the second FIR echo compensation filter.

3. Method for echo compensation with a common-frequency transmission method in duplex mode over a two-wire line for application during the transmission of data with very different data rates in the transmission and reception directions, comprising the following steps:

(a) calculating filter coefficients of an IIR filter as a function of the filter coefficients of an FIR echo compensation filter;

(b) adjusting the IIR filter in accordance with the calculated filter coefficients; and (c) subtracting a transmitter output signal, after filtering by means of the FIR filter, from the receiver input signal, the FIR-filtered transmission signal being additionally filtered by means of the IIR filter, and the filtered output signal IIR filter being also subtracted from the receiver input signal, wherein, when there is a high data rate in the transmission direction and a low data rate in the reception direction, a corresponding decimation of the signal takes place respectively after the filtering by means of the FIR filter and after the filtering by means of the IIR filter.

4. Method according to claim 3, wherein, when there is a low data rate in the transmission direction and a high data rate in the reception direction, interpolation (zero stuffing) of the signal to be filtered is carried out by means of an interpolation device upstream of the filtering by means of the transmission signal by means of the FIR filter.

5. Method according to claim 4, wherein, after first FIR filtering of the interpolated signal by means of the FIR filter, further filtering takes place by means of a further FIR filter with a reduced data rate by virtue of the signal being subjected to decimation by means of a decimation device upstream of the further filtering and being subjected to interpolation by means of a further interpolation device downstream of the further filtering.

6. Apparatus for echo compensation on a subscriber side with a common frequency transmission method in a duplex mode over a two wire line, the apparatus comprising:

(a) a transmitter which transmits a transmission signal with a low data rate;

(b) a first interpolation device which interpolates the transmission signal;

(c) a first FIR echo compensation filter with adjustable filter coefficients which filters the transmission signal interpolated by said first interpolation device;

(d) an IIR filter with adjustable filter coefficients, wherein the output of the first FIR echo compensation filter is connected to the input of the IIR filter;

(e) a calculation device for calculating filter coefficients of the IIR filter as a function of the filter coefficients of the first FIR echo compensation filter;

(f) an adjustment device for adjusting the IIR filter in accordance with the calculated filter coefficients; and (g) a second FIR echo compensation filter which is connected on its input side via a first decimation device to the output of the first FIR echo compensation filter and on its output side via a second interpolation device which is provided for interpolation to a high data rate of a reception signal for a negative input to a first summation point having a positive input to which the reception signal is applied, wherein the output of the IIR filter is connected to a negative input of a second summation point having a positive input which is connected to the output of the first summation point and having an output connected to said receiver.

7. Apparatus for echo compensation on a control center side with a common frequency transmission method in a duplex mode over a two-wire line, the apparatus comprising:

(a) a transmitter which transmits a transmission signal with a high data rate;

(b) a first FIR echo compensation filter with adjustable filter coefficients which filters the transmission signal;

(c) an IIR-filter with adjustable filter coefficients, wherein the output of the first FIR echo compensation filter is connected to the input of the IIR filter;

(d) a calculation device for calculating the filter coefficients of the IIR filter as a function of the filter coefficients of the FIR echo compensation filter;

(e) an adjustment device for adjusting the IIR filter in accordance with the calculated filter coefficient; and (f) a second FIR echo compensation filter which is connected on its input side via a second decimation device to the first FIR echo compensation filter and which is connected on its output side to a negative input of a first summation point, wherein at the positive input of the first summation point a reception signal for a receiver having a low data rate is applied, wherein the output of the first FIR echo compensation filter is connected to a negative input of a third summation point having a positive input connected to the output of the IIR filter and having an output which is connected via a third decimation device to a fourth summation point having a negative input which is connected to the output of said second FIR echo compensation filter and having an output which is connected to a negative input of the second summation point, wherein a positive input of the second summation point is connected to the output of the first summation point and an output of the second summation point is connected to said receiver.

* * * * *